A. B. FIELD & B. A. BEHREND.
COIL RETAINING MEANS.
APPLICATION FILED FEB. 21, 1914.
1,269,590.
Patented June 18, 1918.
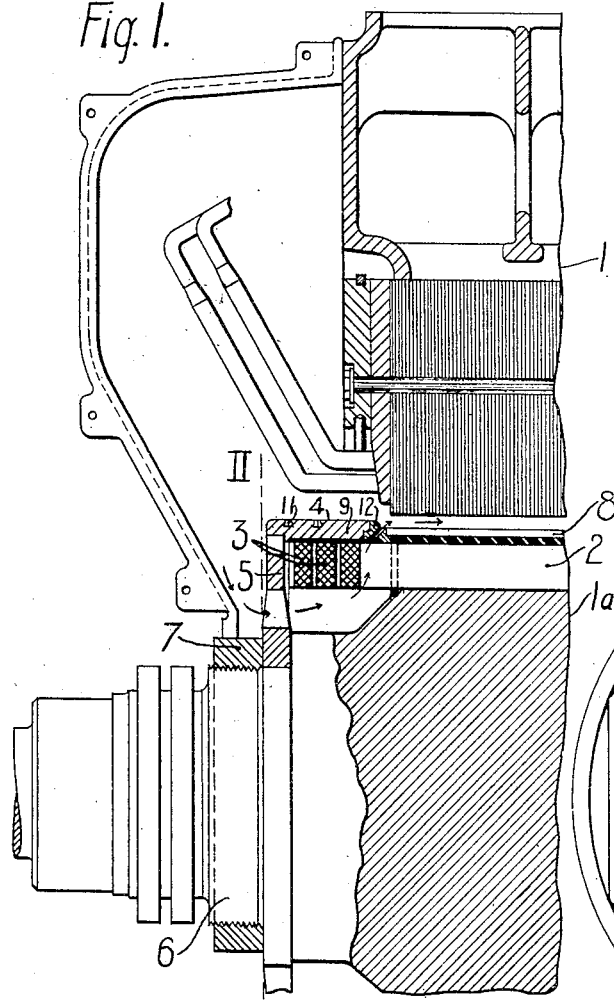
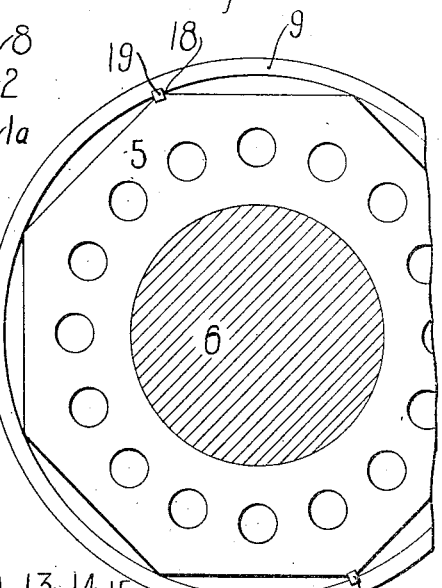
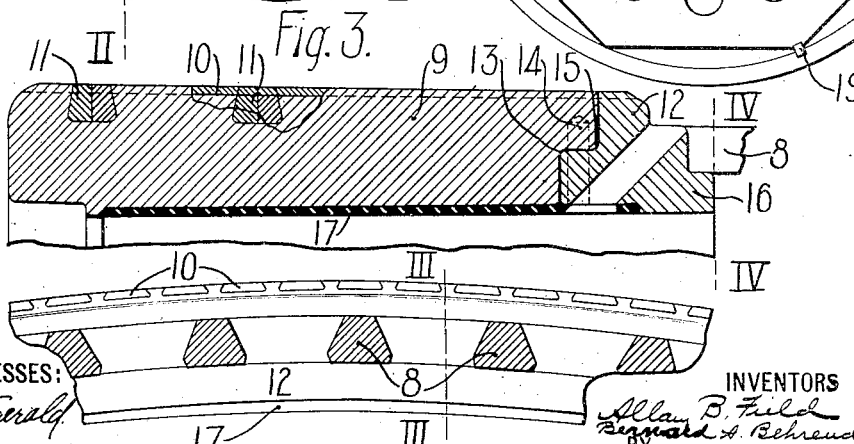
WITNESSES:
A. J. Fitzgerald
W. R. Coley
INVENTORS
Allan B. Field
Bernard A. Behrend
BY Wesley G. Carr
ATTORNEY

UNITED STATES PATENT OFFICE.

ALLAN BERTRAM FIELD, OF WEST CLIFF-ON-SEA, ENGLAND, AND BERNARD A. BEHREND, OF BOSTON, MASSACHUSETTS, ASSIGNORS TO WESTINGHOUSE ELECTRIC AND MANUFACTURING COMPANY, A CORPORATION OF PENNSYLVANIA.

COIL-RETAINING MEANS.

1,269,590.

Specification of Letters Patent. Patented June 18, 1918.

Application filed February 21, 1914. Serial No. 820,266.

*To all whom it may concern:*

Be it known that we, ALLAN B. FIELD, a subject of the King of England, and a resident of West Cliff-on-Sea, Essex, England, and BERNARD A. BEHREND, a citizen of the United States, and a resident of Boston, in the county of Suffolk and State of Massachusetts, have invented a new and useful Imment in Coil-Retaining Means, of which the following is a specification.

Our invention relates to dynamo-electric machines, and it has special reference to coil-retaining means particularly adapted for use in connection with the overhanging end-portions of coils in the rotors of high-capacity turbo-generators and the like that carry unbalanced electrical loads.

One object of our invention is to provide a device of the above-indicated character which shall be so constructed and arranged that the iron losses in the retaining-ring, that would ordinarily be present by reason of unsymmetrical magnetic conditions arising as a result of the unbalanced electrical load, may be obviated or at least rendered of negligible value.

Another object of our invention is to provide a coil-retaining ring embodying a single member for performing the triple function of short-circuiting adjacent ends of the bars of damping grids that are respectively disposed both in the rotor core proper and in the retaining ring, and of acting as a non-magnetizable spacer between the rotor body and the ring proper.

A further object of our invention is to provide a coil-retaining ring which, in addition to possessing the above mentioned magnetic properties, shall be compact and practically indestructible and which shall effectively perform its intended mechanical functions.

Where a dynamo-electric machine must necessarily carry an unbalanced electrical load, such as an unevenly distributed three-phase load, which is equivalent to a single-phase load superposed on a three-phase balanced load, the unsymmetrical magnetic conditions that always arise with a single-phase load occur here also. As a result, a very heavy magnetic flux would normally be induced in the retaining ring, which is necessarily made of a high grade of steel or steel alloy, for mechanical reasons; and as this flux would be continually varying, by reason of the unbalanced character of the electrical load, relatively heavy stray power losses would occur in the ring, if no preventive means were provided. It will be understood that, under such operating conditions, a damping grid of familiar form would have to be provided in the rotor core and, in the case of turbo-generators, the bars of such a grid might also conveniently constitute wedges for the rotor coils.

According to our present invention, we propose to overcome the objectionable features just recited by firmly embedding a damping grid in the periphery of the steel retaining ring that is complete with the exception of a short-circuiting member for one end of the grid bars. To complete the damping grid, we provide an annular member of non-magnetizable material that is suitably secured intimately to the axially inner end of the retaining ring and that also serves to short-circuit the coil wedges constituting a portion of the rotor damping grid. In this manner, the annular member referred to constitutes a portion of both damping grids and also acts as a non-magnetizable spacer between the rotor body and the magnetizable ring.

In the accompanying drawing, Figure 1 is a view, in longitudinal section, of a portion of a dynamo-electric machine embodying our invention. Fig. 2 is a view taken on the line II—II of Fig. 1, Fig. 3 is a sectional view taken on the line III—III of Fig. 4, and Fig. 4 is a view taken on the line IV—IV of Fig. 3.

Referring to the drawing, the portion of a dynamo-electric machine here shown comprises a stator 1 and a rotor magnetizable core 1ª having slots in which coils 2, having the usual over-hanging end-portions 3, are suitably disposed; a coil-retaining device 4 encircling and peripherally supporting the end-portions in a well-known manner; and means for suitably positioning the device 4, which may conveniently comprise a radially-disposed plate 5, suitably apertured for ventilating purposes, which fits on the shaft 6 of the machine and is suitably joined to the outer end of the device, and an adjustable nut 7 that bears against the plate 5.

It will be understood that the application of our invention is not limited to the specific and familiar apparatus shown and, consequently, only so much of this apparatus will be described as is requisite to a clear understanding of our invention.

The coils 2 are held in place in the slots by wedges 8 of non-magnetizable material which also constitute a portion of a damping grid for the rotor, as hereinbefore mentioned.

The device 4 comprises a ring 9 of magnetizable material having great mechanical strength, such as some one of the steel alloys; a plurality of wedge-sectioned bars 10 of non-magnetizable material embedded in longitudinal grooves in the periphery of the ring; one or more wedge-sectioned rings 11 for short-circuiting the bars 10 at their outer ends and circumferentially embedded in grooves in the ring periphery, and a plurally apertured annular member 12 disposed at the inner end of the ring 9 and having a flange 13 suitably secured, as by pins 14, within an end-flange 15 of the ring 9. The member 12 serves to complete the damping grid associated with the coil-retaining ring and also has a flanged portion 16 that is adapted to short-circuit the adjacent ends of the coil wedges 8 which, as hereinbefore noted, form a portion of the rotor damping grid. The bars 10 and the rings 11 may be calked or hydraulically swaged into their final position, as illustrated in the drawing.

Suitable insulating and protective material 17 may be disposed in the inner periphery of the ring 9, if desired. One or more keyways 18 (shown in Fig. 2) and coöperating keys or wedges 19, that are suitably associated with the plate 5, are preferably provided to prevent rotative movement of the coil-retaining device.

The theory of operation of the damping grid associated with the coil-retaining ring 9 in effecting an elimination, or a reduction to negligible value, of the stray power losses that would develop in an unprotected magnetizable ring is deemed to be sufficiently well known to those skilled in the art in connection with dynomo-electric machines of various kinds to obviate the necessity of any explanation here.

It should be observed that an effective ventilation of the coil-end portions 3 is obtained by reason of the air currents produced, during operation, through the apertures in the plate 5 and in the annular member 12, as indicated by the arrows.

We do not wish to be restricted to the specific structural details and arrangement of parts herein set forth, but desire that only such limitations shall be imposed as are indicated in the accompanying claims.

We claim as our invention:

1. In a dynamo-electric machine, the combination with a magnetizable core provided with a plurality of coils having overhanging end-portions, of a magnetizable member for peripherally supporting said end-portions, and a grid comprising a plurality of highly conductive bars embedded in said magnetizable member, said bars extending longitudinally and circumferentially around said member.

2. In a dynamo-electric machine, the combination with a magnetizable core provided with a plurality of coils having overhanging end-portions, of an annular magnetizable member for peripherally supporting said end-portions, and a plurality of non-magnetizable bars of conductive material disposed in intimate relation with said member and adapted to constitute a damping winding around the periphery of said member.

3. In a dynamo-electric machine, the combination with a magnetizable core provided with a plurality of coils having overhanging end-portions, of a retaining ring for said end-portions of magnetizable material, and a damping grid of non-magnetizable material embedded in the outer surface of said ring.

4. In a dynamo-electric machine, the combination with a magnetizable core provided with a plurality of coils having overhanging end-portions, of a retaining ring for said end-portions of magnetizable material having relatively great mechanical strength, a plurality of wedge-sectioned bars of non-magnetizable material transversely embedded in the periphery of the ring, a wedge-sectioned ring for short circuiting said bars at one end and circumferentially embedded in said periphery, and a plurally apertured annular member of non-magnetizable material secured to said retaining ring for short-circuiting said bars at their other ends and adapted to act as a non-magnetizable spacer between said retaining ring and said core.

5. In a dynamo-electric machine, the combination with a magnetizable core member having a plurality of peripheral slots and a plurality of coils severally disposed in said slots and having overhanging end-portions, of a plurality of wedging members of non-magetizable material for said coils, a magnetizable retaining ring for said end-portions, an incomplete damping grid intimately associated with said ring, and means secured to said ring for completing said grid and for short-circuiting said wedging members at one end.

6. In a dynamo-electric machine, the combination with a magnetizable core member having a plurality of peripheral slots and a plurality of coils severally disposed in said slots and having overhanging end-portions, of a plurality of wedging members of non-magnetizable material for said coils, a retaining ring of magnetizable material provided with an end flange, an incomplete damping grid embedded in the periphery of said ring, and an annular member of non-magnetizable material having a flange secured within the said end flange and adapted to complete said grid and to short-circuit said wedging members at one end.

7. An end-turn-retaining device for the coils of dynamo-electric machines comprising a magnetizable ring having a damping grid in intimate relation therewith, said damping grid comprising a network of conducting bars extending substantially around the periphery of said ring.

8. An end-turn-retaining device for the coils of dynamo-electric machines comprising a magnetizable ring provided with an incomplete damping grid, and a non-magnetizable annular member associated with said ring to complete said grid.

9. A coil-retaining device for dynamo-electric machines comprising a magnetizable ring having relatively great mechanical strength and provided with an end-flange, a plurality of non-magnetizable wedge-sectioned bars transversely embedded in the ring periphery, a wedge sectioned ring for short-circuiting said bars at one end and circumferentially embedded in said periphery, and a plurally-apertured annular member having a flange secured within said end-flange and adapted to short-circuit said bars at their other ends.

In testimony whereof, we have hereunto subscribed our names this 15th day of January, 1914.

ALLAN BERTRAM FIELD.
BERNARD A. BEHREND.

Witnesses:
ARTHUR HENRY HOPPER,
WALTER J. SKERTEN,
LILLIAN J. BRITTON,
HARRY G. DIXON.

Copies of this patent may be obtained for five cents each, by addressing the "Commissioner of Patents, Washington, D. C."